March 17, 1953 R. G. TILLOU ET AL 2,631,841
LOAD SUPPORTING SHOCK ABSORBER
Filed April 28, 1951 2 SHEETS—SHEET 1

Inventors
Richard G. Tillou.
Anthony E. Pawlak.
By Henry Fuchs
Atty

March 17, 1953 R. G. TILLOU ET AL 2,631,841
LOAD SUPPORTING SHOCK ABSORBER
Filed April 28, 1951 2 SHEETS—SHEET 2

Inventors:
Richard G. Tillou.
Anthony E. Pawlak.
By Henry Fuchs
Atty.

Patented Mar. 17, 1953

2,631,841

UNITED STATES PATENT OFFICE 2,631,841

LOAD SUPPORTING SHOCK ABSORBER

Richard G. Tillou, Lombard, and Anthony E. Pawlak, Berwyn, Ill., assignors to W. H. Miner, Inc., Chicago, Ill., a corporation of Delaware Application April 28, 1951, Serial No. 223,464

5 Claims. (Cl. 267—1)

This invention relates to improvements in shock absorbers, and more particularly shock absorbers employed in connection with supports for heavy objects.

One object of the invention is to provide a shock absorber of relatively high capacity, for cushioning both pushing and pulling shocks imparted to an object supported by the same.

A more specific object of the invention is to provide a shock absorber comprising a friction casing, friction shoes slidable within the casing, a wedge in wedging engagement with the shoes, spring means within the casing yieldingly opposing inward movement of the shoes, a pair of followers movable toward and away from each other, one of said followers bearing on the wedge and having a housing secured thereto, a bolt anchored at one end to the other follower and at the other end to the wedge, the housing surrounding the casing and having shouldered engagement with the latter to limit movement of the casing away from the follower to which the housing is secured, and a spring disposed within the housing and surrounding the casing, said spring reacting between the housing and the follower to which the bolt is anchored to yieldingly resist relative approach of said followers, said spring normally holding the casing spaced from the follower to which the bolt is anchored to provide for preliminary compression of said spring before the friction shoes are actuated in compression of the mechanism.

Other objects of the invention will more clearly appear from the description and claims hereinafter following.

Figure 1:
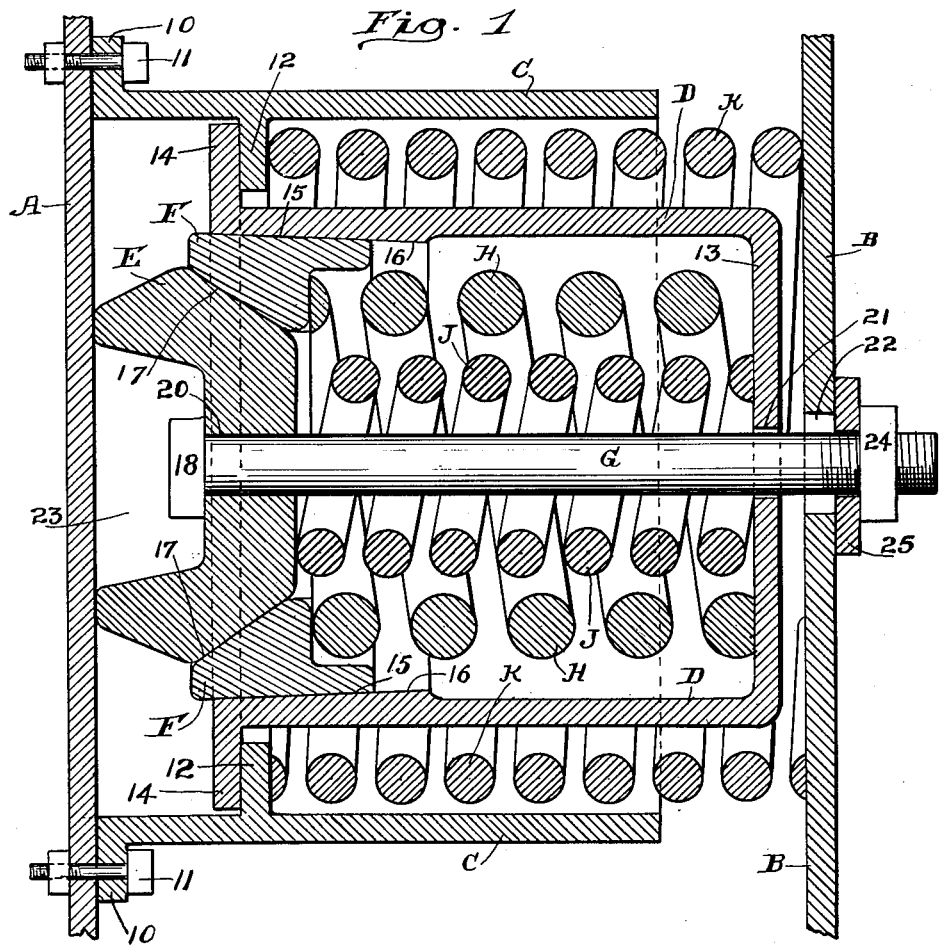
Figure 2:
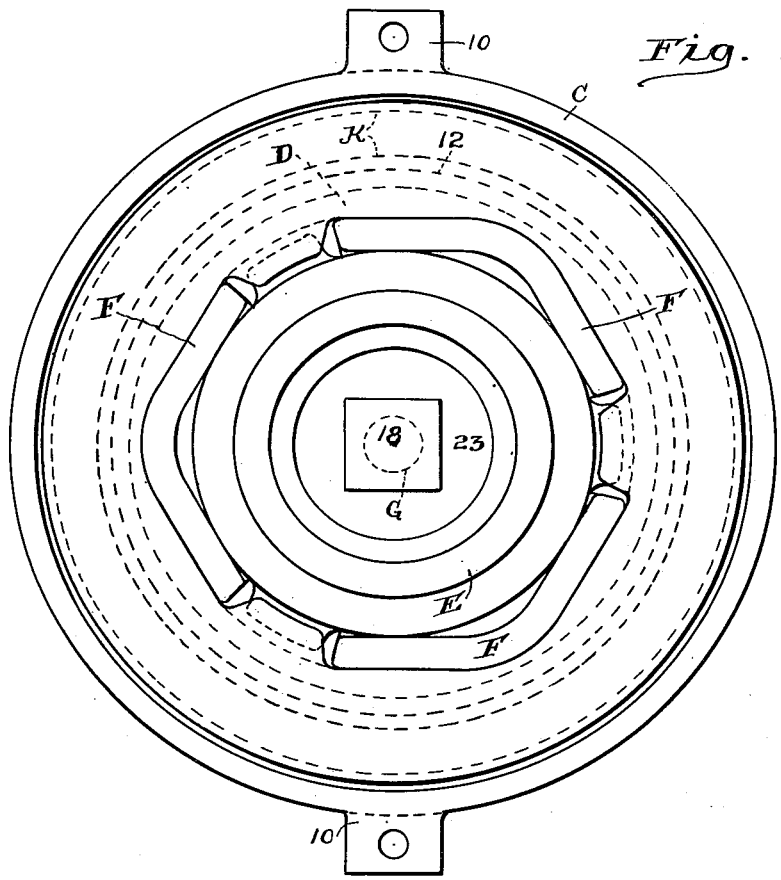
Figure 3:
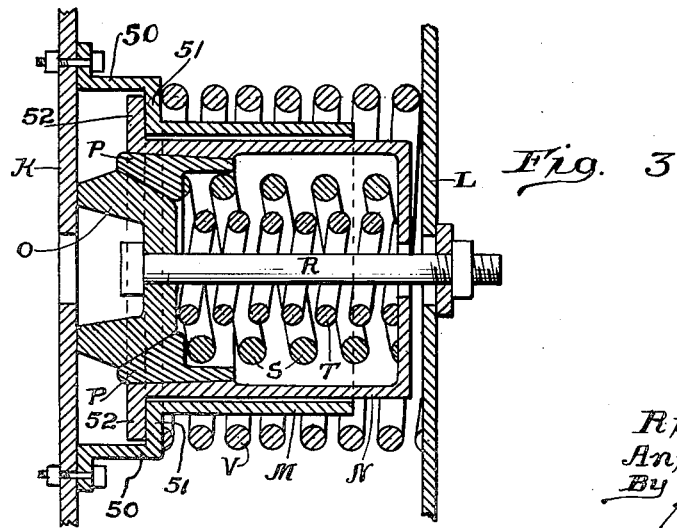

In the accompanying drawings forming a part of this specification, Figure 1 is a longitudinal sectional view of our improved shock absorber, with certain parts partly broken away. Figure 2 is an end elevational view of Figure 1, looking from left to right in said figure, with the left hand follower omitted. Figure 3 is a view similar to Figure 1, on a reduced scale, illustrating another embodiment of the invention.

The improved shock absorber comprises broadly a follower A, a second follower B, a housing C fixed to the follower A, a friction casing D, a wedge E, friction shoes F—F—F, a draft bolt G, springs H and J within the casing D, and a spring K surrounding the casing D and extending into the housing C.

The followers A and B are shown as platelike members, which are movable toward and away from each other. In the present instance, the followers A and B are shown as broken away, the same being portions of larger members which are relatively movable toward and away from each other, for example, respectively, a portion of a wall of a container and a portion of a support fixed to an object housed within the container.

The housing C is in the form of a hollow cylinder fixed to the follower A, the housing being provided with diametrically opposite, outwardly projecting lugs 10—10 at the left hand end thereof, as seen in Figure 1, fixed to the follower A by bolts 11—11 extending through the lugs 10—10 and said follower. This housing is provided with an interior, annular stop flange 12, projecting laterally from the cylindrical wall of said housing and spaced inwardly from the left hand end of the same.

The friction casing D is in the form of a tubular member of hexagonal, transverse cross section, open at its left hand end and closed by a transverse wall 13 at its right hand end, as seen in Figure 1. At the open end thereof, the casing D is provided with an outwardly projecting, annular flange 14 adapted to engage with the stop flange 12. The flange 14, by engagement with the stop flange 12, limits outward movement of the casing with respect to the housing C to normally hold the closed end of the casing spaced from the follower B.

The friction shoes F, which are three in number, are arranged symmetrically about the longitudinal axis of the mechanism and are telescoped within the casing D. The shoes F have longitudinally extending friction surfaces 15, which are slidingly engaged with lengthwise extending interior friction surfaces 16 on the casing D.

The wedge E is in the form of a block abutting the follower A at its outer end and having three wedge faces 17—17—17 at its inner end in wedging engagement respectively with the three shoes F—F—F.

The springs H and J are disposed within the casing D, each being in the form of a helical coil. The spring H surrounds the spring J and has its opposite ends bearing respectively on the wall 13 of the casing D and the inner ends of the shoes F—F—F. The spring J has its opposite ends bearing respectively on said wall 13 and the inner end of the wedge E.

The spring K, which is also in the form of a helical coil, surrounds the casing D within the housing C and has its opposite ends bearing respectively on the follower B and the flange 12 of the housing.

The draft bolt G is provided with a head 18 at its left hand end and is threaded at its right hand end, as seen in Figure 1. The bolt G extends through the casing D, an opening 20 in the wedge E, an opening 21 in the transverse wall 13 of the casing, and an opening 22 in the follower B. The head 18 of the bolt G is accommodated in a pocket 23 of the wedge E and is shouldered against the end wall of said pocket. The bolt G is anchored to the follower B by a nut 24 engaged with the threaded end thereof and bears on a washer 25 interposed between said nut and the outer side of the follower B. The parts of the mechanism are proportioned and the nut 24 is adjusted so that the closed end of the casing D is normally spaced an appreciable distance from the follower B to provide for a certain amount of compression of the spring K as the followers A and B are moved toward each other, before the friction means is actuated by movement of the casing D and the follower A toward each other.

The operation of our improved shock absorber is as follows: Upon movement of the followers A and B away from each other, the wedge E will be forced inwardly of the casing D by the pulling action of the bolt G, thereby spreading the friction shoes apart and forcing the same inwardly of the casing along the friction surfaces thereof, opposed by the resistance of the springs H and J, the casing at this time being held against movement away from the follower A by the stop flange 12 of the housing C. High frictional resistance to absorb pulling shocks is thus provided. Upon reduction of the actuating force, the springs H and J return the parts to the normal position shown in Figure 1, outward movement of the wedge E being limited by the follower A.

Upon movement of the followers A and B toward each other, the outer spring K is first compressed, thereby providing soft spring action during the first part of the compression stroke. During further movement of the followers A and B toward each other, the casing D is engaged by the follower B and moved toward the follower A, thereby forcing the wedge E inwardly of the casing, thus providing high frictional resistance during the remainder of the compression stroke of the mechanism by inward sliding movement of the friction shoes F—F—F on the friction surfaces of the casing. Upon reduction of the compression force, the parts are all returned to their normal positions by the springs H, J, and K, movement of the wedge toward the follower A being limited by abutment with the latter, outward movement of the casing D away from the follower A being limited by the flange 12 of the housing C, and outward movement of the follower B with respect to the casing D being limited by the bolt G.

Referring next to the embodiment of the invention illustrated in Figure 3, the same comprises followers K and L, a housing M, a friction casing N, a wedge O, friction shoes P—P—P, a draft bolt R, springs S, T, and V, the followers K and L, friction casing N, wedge O, shoes P—P—P, draft bolt R, and springs S and T being in all respects identical with and similarly arranged to the followers A and B, casing D, wedge E, shoes F—F—F, bolt G, and springs H and J hereinbefore described.

The housing M is in the form of a stepped cylinder having a diametrically enlarged portion 50 at the left hand end thereof, as seen in Figure 3, which provides a transverse shoulder 51 with which the annular flange 52 of the friction casing N is engageable. The spring V, which is in the form of a helical coil, and functions in a manner similar to the spring K hereinbefore described, surrounds the casing N and has its opposite ends bearing on the follower L and the transverse shoulder 51 of the casing N. The construction shown in Figure 3 is thus the same as that shown in Figures 1 and 2, with the exception that the spring V, which provides for preliminary soft action is disposed exteriorly of the housing, instead of interiorly thereof as the spring K hereinbefore described.

The operation of the mechanism shown in Figure 3 is substantially the same as that of the mechanism shown in Figures 1 and 2, hereinbefore described.

We claim:

1. In a shock absorber, the combination with a follower; of a second follower, said followers being movable toward and away from each other; a housing fixed to said first named follower and extending toward said second named follower; a transverse abutment on said housing; a friction casing within said housing; a spring exterior to said friction casing and bearing at opposite ends on said abutment and said second named follower; a stop projection on said casing engageable with said transverse abutment to limit outward movement of the casing with respect to said housing and normally hold the outer end of the casing spaced from said second named follower; a wedge abutting said first named follower; shoes slidable in the casing in wedging engagement with said wedge; springs within the casing reacting between the latter and the shoes and wedge to oppose movement of said shoes and wedge inwardly of the casing; and a bolt having shouldered engagement at opposite ends with the wedge and said second named follower for limiting movement of the wedge away from said second named follower.

2. In a shock absorber, the combination with a follower; of a second follower, said followers being movable toward and away from each other; a housing fixed to said first named follower and extending toward said second named follower; a transverse abutment on said housing; a friction casing within said housing; a spring exterior to said friction casing and bearing at opposite ends on said abutment and said second named follower, said spring being disposed within said housing; a stop projection on said casing engageable with said transverse abutment to limit outward movement of the casing with respect to said housing and normally hold the outer end of the casing spaced from said second named follower; a wedge abutting said first named follower; shoes slidable in the casing in wedging engagement with said wedge; springs within the casing reacting between the latter and the shoes and wedge to oppose movement of said shoes and wedge inwardly of the casing; and a bolt having shouldered engagement at opposite ends with the wedge and said second named follower for limiting movement of the wedge away from said second named follower.

3. In a shock absorber, the combination with a follower; of a second follower, said followers being movable toward and away from each other; a housing fixed to said first named follower and extending toward said second named follower; a transverse abutment on said housing, said abutment being in the form of an interior flange on said housing; a friction casing within said housing; a spring exterior to said friction casing and bearing at opposite ends on said abutment and said second named follower, said spring being disposed within said housing; a stop projection on said casing engageable with said transverse abutment to limit outward movement of the casing with respect to said housing and normally hold the outer end of the casing spaced from said second named follower; a wedge abutting said first named follower; shoes slidable in the casing in wedging engagement with said wedge; springs within the casing reacting between the latter and the shoes and wedge to oppose movement of said shoes and wedge inwardly of the casing; and a bolt having shouldered engagement at opposite ends with the wedge and said second named follower for limiting movement of the wedge away from said second named follower.

4. In a shock absorber, the combination with a follower; of a second follower, said followers being movable toward and away from each other; a housing fixed to said first named follower and extending toward said second named follower; a transverse abutment on said housing; a friction casing within said housing; a spring exterior to said friction casing and bearing at opposite ends on said abutment and said second named follower, said spring surrounding said housing; a stop projection on said casing engageable with said transverse abutment to limit outward movement of the casing with respect to said housing and normally hold the outer end of the casing spaced from said second named follower; a wedge abutting said first named follower; shoes slidable in the casing in wedging engagement with said wedge; springs within the casing reacting between the latter and the shoes and wedge to oppose movement of said shoes and wedge inwardly of the casing; and a bolt having shouldered engagement at opposite ends with the wedge and said second named follower for limiting movement of the wedge away from said second named follower.

5. In a shock absorber, the combination with a follower; of a second follower, said followers being movable toward and away from each other; a housing fixed to said first named follower and extending toward said second named follower; a transverse abutment on said housing, said housing being reduced in diameter at the end thereof adjacent said second named follower, thereby providing a transverse shoulder forming said abutment; a friction casing within said housing; a spring exterior to said friction casing and bearing at opposite ends on said abutment and said second named follower, said spring surrounding said housing; a stop projection on said casing engageable with said transverse abutment to limit outward movement of the casing with respect to said housing and normally hold the outer end of the casing spaced from said second named follower; a wedge abutting said first named follower; shoes slidable in the casing in wedging engagement with said wedge; springs within the casing reacting between the latter and the shoes and wedge to oppose movement of said shoes and wedge inwardly of the casing; and a bolt having shouldered engagement at opposite ends with the wedge and said second named follower for limiting movement of the wedge away from said second named follower.

RICHARD G. TILLOU.
ANTHONY E. PAWLAK.

REFERENCES CITED

The following references are of record in the file of this patent:

UNITED STATES PATENTS

| Number | Name | Date |
|---|---|---|
| 1,073,161 | O'Connor | Sept. 16, 1913 |
| 1,122,940 | Johnson | Dec. 29, 1914 |
| 2,439,843 | Dath | Apr. 20, 1948 |
| 2,448,138 | Dath | Aug. 31, 1948 |
| 2,451,569 | Lounsbury | Oct. 19, 1948 |